US009763200B2

(12) United States Patent
Choi (10) Patent No.: US 9,763,200 B2
(45) Date of Patent: Sep. 12, 2017

(54) BROADCASTING SYSTEM FOR WIRELESS NETWORK AND BROADCASTING SERVICE PROVISION METHOD FOR WIRELESS NETWORK (71) Applicant: GWANGJU INSTITUTE OF SCIENCE AND TECHNOLOGY, Gwangju (KR)

(72) Inventor: Jinho Choi, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 84 days.

(21) Appl. No.: 14/845,267

(22) Filed: Sep. 4, 2015

(65) Prior Publication Data

US 2016/0081058 A1 Mar. 17, 2016

(30) Foreign Application Priority Data

Sep. 11, 2014 (KR) ........................ 10-2014-0119983

(51) Int. Cl.
*H04W 52/18* (2009.01)
*H04L 5/00* (2006.01)
(Continued)

(52) U.S. Cl.
CPC ............... *H04W 52/18* (2013.01); *H04L 1/18* (2013.01); *H04L 5/0055* (2013.01); *H04W 52/267* (2013.01)

(58) Field of Classification Search
CPC ... H04L 5/0055; H04L 1/1867; H04L 1/0026; H04L 1/1614
(Continued)

(56) References Cited

U.S. PATENT DOCUMENTS

| 2005/0163058 A1* | 7/2005 | Nabetani | H04L 47/10 370/252 |
| 2011/0222419 A1* | 9/2011 | Callaway, Jr. | H04W 52/0261 370/252 |
| 2013/0016687 A1* | 1/2013 | Yang | H04L 1/1614 370/329 |

FOREIGN PATENT DOCUMENTS

| KR | 1020060077928 A | 7/2006 |
| KR | 1020120062544 A | 6/2012 |

OTHER PUBLICATIONS

ETSI TS 122 146, "Digital cellular telecommunications system (Phase 2+); Universal Mobile Telecommunications System (UMTS); LTE; Multimedia Broadcast/Multicast Service (MBMS); Stage 1", 3GPP TS 22.146, LTE, May 2013, pp. 1-19, Version 11.1.0 Release 11, ETSI, France.

(Continued)

*Primary Examiner* — Charles C Jiang
*Assistant Examiner* — Will Lin
(74) *Attorney, Agent, or Firm* — Hauptman Ham, LLP (57) ABSTRACT

Disclosed herein is a broadcasting system using a wireless communication system, including a subscriber to receive a broadcast signal and transmits an ACK signal or NACK signal depending on whether or not the broadcast signal is normally decoded; and a broadcast transmitter to transmit the broadcast signal and set a maximum throughput based on the ACK signal or NACK signal transmitted from the subscriber to transmit the broadcast signal. According to embodiments of the present invention, broadcast services can be provided with the maximum efficiency, and therefore power consumption may be reduced, radio resources may be prevented from being wasted. When broadcast services according to the present invention are used, desired advantages may be expected in terms of overall efficiency of a network.

8 Claims, 5 Drawing Sheets

(51) Int. Cl.
*H04L 1/18* (2006.01)
*H04W 52/26* (2009.01)

(58) Field of Classification Search
USPC .................................................. 370/252, 254
See application file for complete search history.

(56) References Cited

OTHER PUBLICATIONS

E. Dahlman et al, "Multimedia Broadcast/Multicast Services", 4G: LTE/LTE—Advanced for Mobile Broadband, 2014, pp. 403-411, Chapter 17, 2nd Edition, Elsevier Ltd.

* cited by examiner

BROADCASTING SYSTEM FOR WIRELESS NETWORK AND BROADCASTING SERVICE PROVISION METHOD FOR WIRELESS NETWORK

CROSS-REFERENCE TO RELATED APPLICATIONS

This application claims the benefit of Korean Patent Application No. 10-2014-0119983, filed on Sep. 11, 2014, entitled "BROADCASTING SYSTEM FOR WIRELESS NETWORK AND BROADCASTING SERVICE PROVISION METHOD FOR WIRELESS NETWORK", which is hereby incorporated by reference in its entirety into this application.

BACKGROUND OF THE INVENTION

Field of the Invention

The present invention relates to a broadcasting system for a wireless network. More particularly, the present invention relates to a broadcasting system for a wireless network which is capable of providing broadcast services to mobile terminals with high efficiency.

Description of the Related Art

Provision of broadcast services over a wireless network is a usage type of the wireless network. A typical example of broadcast services may be disaster broadcast, through which emergency announcements such as a special weather report are transmitted to mobile terminals. As another example of broadcast services, a broadcast signal warning of danger may be sent to only telephones located in an area where a landslide is expected, such that people in the area prepare for any accidents. A disaster broadcast service called Multimedia Broadcast Multicast Services (MBMS) is used in an LTE wireless network. For usage of MBMS, refer to non-patent documents 1 and 2.

The broadcast service, which is contrasted with unicast for one-to-one communication, may be construed as representing a one-to-many relationship.

In a broadcasting system using a wireless network, a service is generally broadcast repeatedly with high transmission power for a long time such that the announcement is delivered to all subscribers in case that the quality of the network is bad. For example, when there is an urgent danger such as an urgent disaster, broadcasting may be performed on the assumption of a situation in which the quality of the network is bad (due to, for example, lots of noises). Thereby, many people may receive the broadcast signal. However, unnecessary power consumption occurs, and a long transmission time is taken. Thereby, radio resources may be wasted. Similarly, if broadcasting is performed based on estimation alone without taking transmission factors into account, an announcement may not be delivered to many users, and unnecessary power consumption and waste of radio resources may be caused.

PRIOR ART LITERATURE

Non-Patent Documents

Non-patent document 1: 3GPP TS 22.146, LTE; Multimedia Broadcast/Multicast Service (MBMS); Stage 1 (Version 11.1.0 Release 11), 2013.
Non-patent document 2: E. Dahlman, S. Parkvall, and J. Skold, 4G: LTE/LTE-Advanced for Mobile Broadband, 2nd Edition. Academic Press, 2013.

SUMMARY OF THE INVENTION

Therefore, the present invention has been made in view of the above problems, and it is an object of the present invention to provide a broadcasting system for a wireless network which is capable of transmitting a broadcast signal with optimized radio resources and transmission efficiency and a method for providing a broadcast service.

According to an aspect of the present, there is provided a broadcasting system using a wireless communication system, including a subscriber to receive a broadcast signal and transmits an ACK signal or NACK signal depending on whether or not the broadcast signal is normally decoded; and a broadcast transmitter to transmit the broadcast signal and set a maximum throughput based on the ACK signal or NACK signal transmitted from the subscriber to transmit the broadcast signal.

According to another aspect of the present invention, there is provided a method for providing a broadcast service using a wireless network, including transmitting a broadcast signal in the wireless network; and transmitting an acknowledgement signal indicating whether the broadcast signal has been normally received.

According to embodiments of the present invention, broadcast services can be provided with the maximum efficiency, and therefore power consumption may be reduced, radio resources may be prevented from being wasted. When broadcast services according to the present invention are used, desired advantages may be expected in terms of overall efficiency of a network.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Reference will now be made in detail to exemplary embodiments of the present invention, examples of which are illustrated in the accompanying drawings. However, the present invention is not limited to the exemplary embodiments disclosed herein but may be implemented in various different forms. The present invention can be readily practiced by those skilled in the art through addition, change, omission and combination of constituents included in other embodiments within the scope of the present invention, which may come within the scope of the appended claims and their equivalents.

Figure 1:
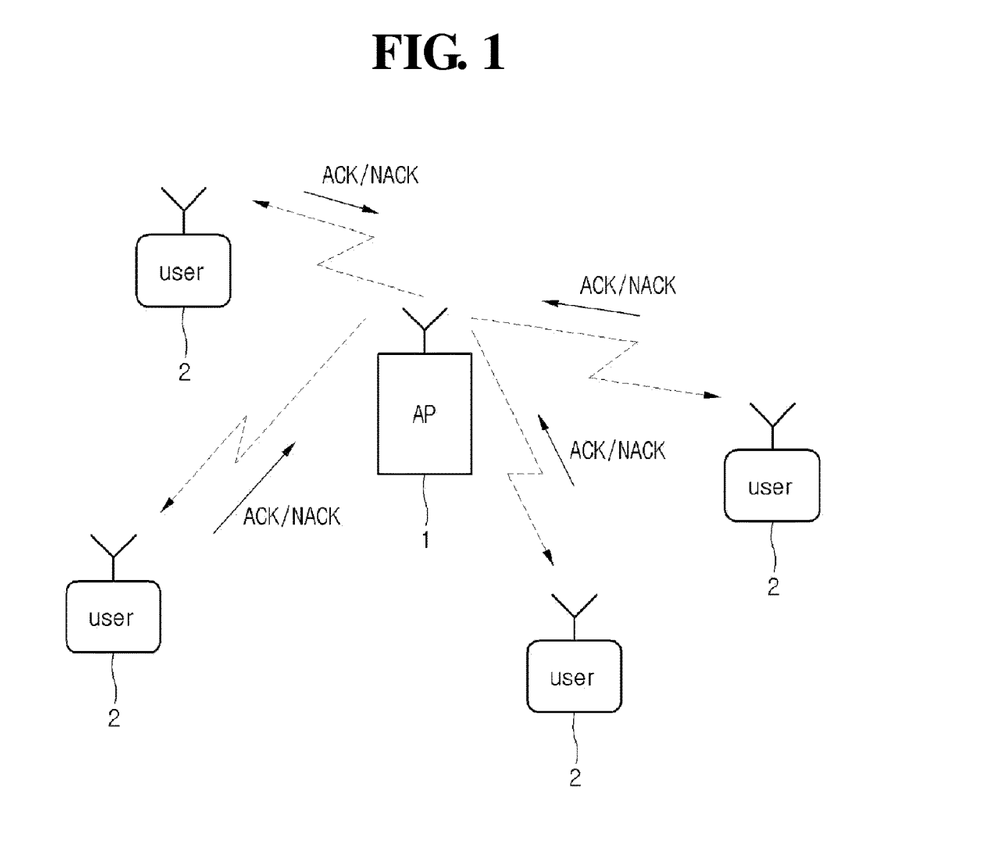
FIG. 1 illustrates configuration of a broadcasting system using a wireless network according to an embodiment of the present invention.

FIG. 1 illustrates configuration of a broadcasting system using a wireless network according to an embodiment of the present invention.

Referring to FIG. 1, a broadcasting system includes a broadcast transmitter 1 to transmit a broadcast signal and at least one user 2 to receive the broadcast signal. Examples of the broadcast transmitter 1 may include an access point (AP), a base station, and an antenna. Examples of the user 2 may include a terminal and a mobile phone.

Once the broadcast transmitter 1 transmits a broadcast signal, the user 2 transmits ACK or NACK depending on whether the signal has been normally decoded. ACK is a message indicating that the broadcast signal has been successfully received, and NACK is a message indicating that the broadcast signal has not been successfully received. The ACK signal may imply that radio reception has been properly performed since there is no noise or little noise in the wireless network, and the NACK signal may imply that radio reception has not been properly performed due to lots of noise in the wireless network or a far distance from the user 2. The ACK or NACK signal may be assigned 1 bit, and thus may not be a burden to the wireless network.

Signal exchange between the broadcast transmitter 1 and the user 2 may be performed using a hybrid automatic repeat request-incremental redundancy (HARQ-IR) scheme. Of course, another standard may be applied to signal exchange.

According to an embodiment, if the transmission power is kept constant based on the ACK or NACK, a transmission rate that maximizes overall throughput of the wireless network may be found and defined as the transmission rate of the broadcasting system that is currently using the wireless network. The transmission rate may be defined by the number of bits transmitted within a unit time.

Hereinafter, a detailed description will be given of operation of the broadcasting system.

When the number of retransmissions from the broadcast transmitter 1 is preset to L (L may be a design variable), transmission power P is constant, and the nominal transmission rate is R, the normalized transmission rate u may be defined by Equation 1.

$$u = \frac{R}{L} \qquad \text{Equation 1}$$

In addition, when the total number of users is K, A(u) denoting the number of users 2 which have successfully decoded the broadcast signal may be defined by Equation 2.

$$A(u) = \sum_{k=1}^{K} B_k(u) \qquad \text{Equation 2}$$

Herein, Bk(u) may be defined by Equation 3. In addition, A(u) may be confirmed through ACK or NACK from the users 2.

$$B_k(u) = \begin{cases} 1, & \text{if } Z_k \geq u; \\ 0, & \text{if } Z_k < u; \end{cases} \qquad \text{Equation 3}$$

Herein, Zk is possibility of successful decoding of the broadcast signal when the k-th user 2 retransmits a packet L times, in consideration of the network condition and signal attenuation.

T(u), which denotes overall throughput, may be given by Equation 4.

$$T(u) = uE[A(u)] \qquad \text{Equation 4}$$

Herein, E[A(u)] denotes the sum of possibilities that Zk for the k-th user will be greater than u for all users, which has a value corresponding to users that has normally receive the signal. The value of u may correspond to transferred data. Thereby, the overall throughput of Equation 4 may be given as a function of normalized transmission rate. Accordingly, a graph of overall throughput with respect to the factor u may be obtained.

The throughput is interpreted as allows. As the normalized transmission rate u increases, E[A(u)] decreases. That is, if the transmission rate per unit time is increased, the possibility of receiving the data may decrease. However, increase of the normalized transmission rate u does not correspond to decrease of possibility of reception. That is, when the normalized transmission rate u is uniformly increased, the possibility of receiving the data tends to gradually decrease and then drastically decrease. Accordingly, a graph as shown in FIG. 5 may be obtained.

Figure 5:
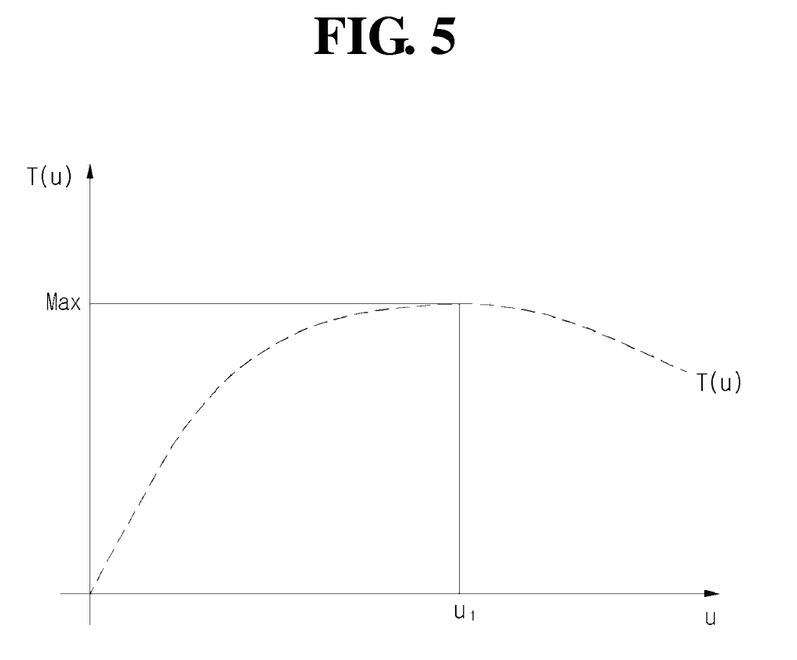
FIG. 5 is a graph depicting overall throughput according to the transmission rate given as a variable.

FIG. 5 is a graph depicting overall throughput given as a function of u.

Referring to FIG. 5, as u increases, the overall throughput tends to increase to a certain level and then decrease after reaching the certain level. Accordingly, by selecting the nominal transmission rate providing the maximum throughput, the maximum efficiency can be obtained. Specifically, it can be seen from the graph that the maximum throughput is obtained at u1.

From a physical point of view, the graph may be understood as implying that the number of users successfully receiving the broadcast signal drastically decreases as the transmission rate increases and that the transmission rate obtaining the maximum throughput is selected.

According to an embodiment, in a broadcasting system using a wireless network, the broadcast transmitter 1 or a base station controlling the broadcast transmitter 1 may recognize the transmission rate obtaining the maximum throughput. Thereafter, the transmission rate of the broadcast transmitter 1 may be changed to the recognized transmission rate.

The broadcasting system may adjust the transmission rate while transmission power P and the number of retransmissions L remain constant. However, embodiments of the present invention are not limited thereto. The object of the embodiment may also be achieved by optimizing the transmission power while the transmission power and the number of retransmissions remain constant.

Specifically, when the transmission rate and the number of the retransmissions remain constant, throughput may be given by Equation 5.

$$T(p) = u(P)E[Au(P)] \qquad \text{Equation 5}$$

Here, u(P)=B log 2(1+PA) according to Shannon's capacity formula, and A and B are constants.

Referring to Equation 5, a curve concave downward may be obtained, similar to Equation 4 having transmission rate as a factor. Then, by selecting a transmission power having the maximum throughput, the broadcasting system may be operated with the optimized transmission power.

Figure 2:
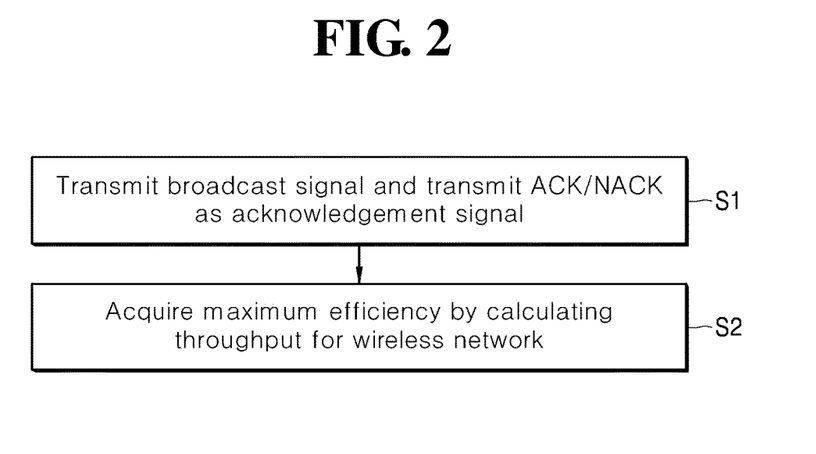
FIG. 2 is a flowchart illustrating a method for providing a broadcast service using a wireless network according to an embodiment of the present invention.

FIG. 2 is a flowchart illustrating a method for providing a broadcast service using a wireless network according to an embodiment of the present invention.

Referring to FIG. 2, once a broadcast transmitter transmits a broadcast signal using a wireless network, a user decodes the signal, determines whether the signal has been normally decoded, and then transmits an ACK or NACK signal as an acknowledgement signal (S1). The wireless network may calculate throughput for all users and control the broadcast transmitter to transmit the broadcast signal with the maximum throughput (S2).

The broadcast transmitter may be controlled such that the transmission rate or transmission power is adjusted.

Figure 3:
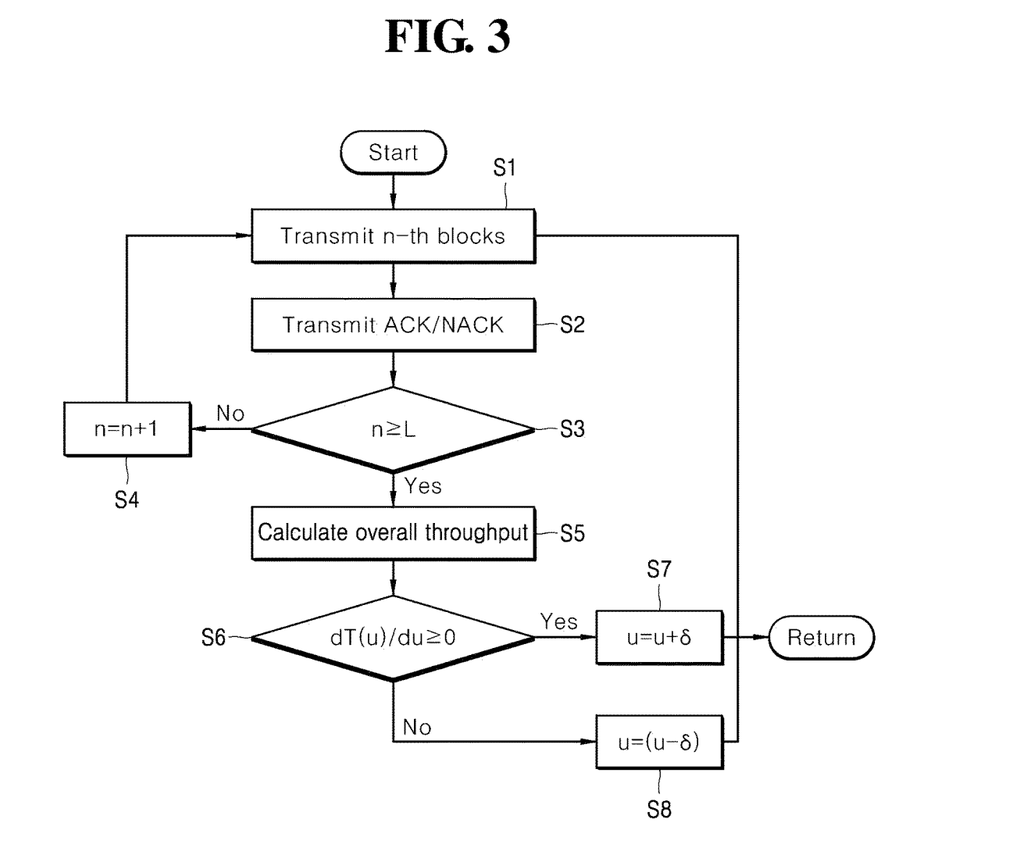
FIG. 3 specifically illustrates a method for providing a broadcast service using a wireless network according to an embodiment of the present invention.

FIG. 3 specifically illustrates a method for providing a broadcast service using a wireless network according to an embodiment of the present invention.

Figure 4:
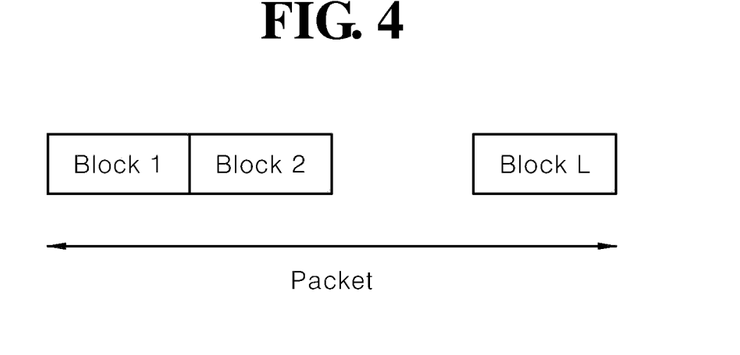
FIG. 4 is a block diagram illustrating retransmission of a packet.

First, the broadcast transmitter 1 transmits an n-th block (S1), wherein n may be set to 1 as a default. Thereafter, an ACK or NACK signal is transmitted from the user 2 (S2). Transmission and reception between the broadcast transmitter and the user may be repeated L times (S3) (S4). In this case, the transmission rate may be changed every time transmission and reception is performed or changed at least twice. FIG. 4 illustrates retransmission of a packet over L blocks.

Thereafter, it is determined whether the throughput T(u) tends to increase or decrease (S6). If the throughput tends to increase, the transmission rate may be increased (S7). If the throughput tends to decrease, the transmission rate may be reduced (S8). Since throughput varies with normalized transmission rate u along a curve having one peak point similar to a second-order curve that is concave downward, the normalized transmission rate u may be understood as being adjusted toward the peak point. The transmission rate obtained in the process described above may be used when a packet is transmitted next time. If multiple experiments have been conducted for the transmission rate, the transmission rate producing the maximum throughput may be immediately identified and selected.

With the method for providing a broadcast service as described above, if transmission has been performed with a predetermined periodicity in consideration of continuous movement of the user, broadcasting may be performed with a transmission rate obtaining the maximum throughput when a request for broadcasting is actually made.

The aforementioned method for providing a broadcast service using the transmission rate as a variable in a wireless network may also be applied in a case where the transmission power is employed as a variable.

When a broadcast service is provided using a wireless network, information may be expected to be spread among users even if broadcasting is not completed for all users, since, for example, transfer of information from user to user occurs. Accordingly, application of the present invention is particularly expected in a restricted space where efficiency is more important than transmission reliability, or a specific situation such as a situation in which power consumption is limited or a situation in which radio resources are limited.

Particularly, when the present invention is applied in one mode of the broadcast service that is applied to operation of the wireless network, wasted radio resources and power may be significantly reduced.

What is claimed is:

1. A broadcasting system using a wireless network, the broadcasting system comprising:
   a plurality of terminals configured to
      receive a first broadcast signal, and
      transmit an acknowledgement signal indicating whether the received first broadcast signal is normally decoded; and
   a broadcast transmitter configured to
      transmit the first broadcast signal in the wireless network,
      receive acknowledgement signals from the plurality of terminals,
      determine, based on the received acknowledgement signals, the number of succeeded terminals which have normally decoded the first broadcast signal,
      set a maximum throughput based on the determined number, and
      transmit a second broadcast signal with the set maximum throughput in the wireless network,
   wherein the broadcast transmitter sets the maximum throughput by adjusting a transmission rate of the second broadcast signal and using the following equation $$T(u)=uE[A(u)]$$

where
      T(u) denotes throughput for transmitting the second broadcast signal,
      u denotes transmission rate,
      A(u) denotes the number of succeeded terminals, and
      E[A(u)] denotes a sum of possibilities of receiving the second broadcast signal by the plurality of terminals.

2. The broadcasting system according to claim 1, wherein the broadcast transmitter is an access point (AP) or a base station.

3. The broadcasting system according to claim 1, wherein the acknowledgement signal is a 1-bit signal.

4. A broadcasting system using a wireless network, the broadcasting system comprising:
   a plurality of terminals configured to
      receive a first broadcast signal transmitted in the wireless network, and
      transmit an acknowledgement signal indicating whether the received first broadcast signal is normally decoded; and
   a broadcast transmitter configured to
      transmit the first broadcast signal in the wireless network,
      receive acknowledgement signals from the plurality of terminals,
      determine, based on the received acknowledgement signals, the number of succeeded terminals which have normally decoded the first broadcast signal,
      set a maximum throughput based on the determined number, and
      transmit a second broadcast signal with the set maximum throughput in the wireless network,
   wherein the broadcast transmitter sets the maximum throughput by adjusting a transmission power of the second broadcast signal and using the following equation $$T(p)=u(P)E[Au(P)]$$

where
      T(p) denotes throughput for transmitting the second broadcast signal,
      u(P) denotes transmission power,
      Au(P) denotes the number of succeeded terminals, and
      E[Au(P)] denotes a sum of possibilities of receiving the second broadcast signal by the plurality of terminals.

5. The broadcasting system according to claim 4, wherein the broadcast transmitter is an access point (AP) or a base station.

6. The broadcasting system according to claim 4, wherein the acknowledgement signal is a 1-bit signal.

7. A method for providing a broadcast service using a wireless network, the method performed by a broadcasting system comprising a plurality of terminals and a broadcast transmitter, the method comprising:
   transmitting, by the broadcast transmitter, a first broadcast signal in the wireless network;
   receiving, by the plurality of terminals, the transmitted first broadcast signal;
   transmitting, by the plurality of terminals, an acknowledgement signal indicating whether the first broadcast signal is normally received;
   receiving, by the broadcast transmitter, acknowledgement signals from the plurality of terminals;
   determining, by the broadcast transmitter and based on the received acknowledgement signals, the number of succeeded terminals which have successfully decoded the first broadcast signal;
   setting a maximum throughput based on the determined number; and
   transmitting a second broadcast signal with the set maximum throughput in the wireless network,
   wherein the broadcast transmitter sets the maximum throughput by adjusting a transmission rate of the second broadcast signal and using the following equation $T(u)=uE[A(u)]$ where
   $T(u)$ denotes throughput for transmitting the second broadcast signal,
   u denotes transmission rate,
   $A(u)$ denotes the number of succeeded terminals, and
   $E[A(u)]$ denotes a sum of possibilities of receiving the second broadcast signal by the plurality of terminals.

8. The method according to claim 7, wherein the acknowledgement signal is a 1-bit signal.

* * * * *